US012657476B2

(12) United States Patent (10) Patent No.: US 12,657,476 B2
Moreira et al. (45) Date of Patent: Jun. 16, 2026

(54) WEAK SUPERVISION FRAMEWORK FOR LEARNING TO LABEL CONCEPT EXPLANATIONS ON TABULAR DATA

(71) Applicant: Feedzai—Consultadoria e Inovação Tecnológica, S.A., Coimbra (PT)

(72) Inventors: Ricardo Miguel de Oliveira Moreira, Lisbon (PT); Vladimir Balayan, Lisbon (PT); João Pedro Bento Sousa, Leiria (PT); Pedro dos Santos Saleiro, Lisbon (PT); Pedro Gustavo Santos Rodrigues Bizarro, Lisbon (PT)

(73) Assignee: Feedzai—Consultadoria e Inovação Tecnológica, S.A. (PT)

( * ) Notice: Subject to any disclaimer, the term of this patent is extended or adjusted under 35 U.S.C. 154(b) by 873 days.

(21) Appl. No.: 17/973,436

(22) Filed: Oct. 25, 2022

(65) Prior Publication Data

US 2023/0133410 A1 May 4, 2023

Related U.S. Application Data

(60) Provisional application No. 63/274,197, filed on Nov. 1, 2021.

(30) Foreign Application Priority Data

Oct. 6, 2022 (EP) ..................................... 22200139

(51) Int. Cl.
*G06N 3/0985* (2023.01)

(52) U.S. Cl.
CPC ................................. *G06N 3/0985* (2023.01)

(58) Field of Classification Search
CPC .... G06N 3/0985; G06N 3/0895; G06N 5/045; G06N 5/01; G06N 5/022; G06N 20/20
See application file for complete search history.

(56) References Cited

U.S. PATENT DOCUMENTS

| 12,229,208 B2 * | 2/2025 | Ahmadvand | ......... | G06F 40/205 |
| 2018/0246867 A1 * | 8/2018 | Chiticariu | ............. | G06F 16/367 |
| 2020/0342361 A1 * | 10/2020 | Mroueh | ................... | G06N 3/09 |

(Continued)

OTHER PUBLICATIONS

Concept Bottleneck Models (Year: 2020).*

(Continued)

*Primary Examiner* — Mohamed Abou El Seoud
(74) *Attorney, Agent, or Firm* — Van Pelt, Yi & James LLP

(57) ABSTRACT

In various embodiments, a process includes receiving input records including tabular data, where the input records are unlabeled for a concept-explainability task. The process includes obtaining primitives for at least a subset of the input records, where the obtained primitives are based at least on at least one annotation including a plurality of user-defined concept labels. The process includes training, using hardware processor(s), a plurality of candidate models using the obtained primitives. For each of the plurality of user-defined concept labels, at least one corresponding model from the plurality of candidate models is used to determine a corresponding concept labeling model. The process includes using the determined corresponding concept labeling models to label the input records with which to train a concept-explainability machine learning model using the labeled input records.

19 Claims, 7 Drawing Sheets

(56)  References Cited

U.S. PATENT DOCUMENTS

| | | | |
|---|---|---|---|
| 2020/0356851 A1* | 11/2020 | Li | G06F 40/30 |
| 2020/0357118 A1* | 11/2020 | Yao | G06V 10/774 |
| 2020/0401929 A1* | 12/2020 | Duerig | G06N 20/00 |
| 2021/0150412 A1* | 5/2021 | Rashidi | G06N 20/00 |
| 2022/0292812 A1* | 9/2022 | Hsiao | G06F 16/353 |
| 2024/0169263 A1* | 5/2024 | Solmaz | G06N 20/00 |

OTHER PUBLICATIONS

Bach et al., Learning the Structure of Generative Models without Labeled Data, Proceedings of the 34th International Conference on Machine Learning, PMLR 70, 2017, pp. 273-282.

Boecking et al., Interactive Weak Supervision: Learning Useful Heuristics For Data Labeling, Machine Learning, Accepted as a conference paper at ICLR 2021, arXiv:2012.06046 [cs.LG], Jan. 25, 2021, pp. 1-27.

Hedderich et al., Training a Neural Network in a Low-Resource Setting on Automatically Annotated Noisy Data, In Proceedings of the Workshop on Deep Learning Approaches for Low-Resource NLP 2018, arXiv:1807.00745 [cs.LG], Jul. 22, 2018, 7 pages.

Mintz et al., "Distant supervision for relation extraction without labeled data", Proceedings of the 47th Annual Meeting of the ACL and the 4th IJCNLP of the AFNLP, 2009, pp. 1003-1011.

Ratner et al., "Data Programming: Creating Large Training Sets, Quickly", 30th Conference on Neural Information Processing Systems, Jan. 8, 2017, pp. 1-9.

Ratner et al., "Snorkel: Rapid Training Data Creation with Weak Supervision", Proceedings VLDB Endowment, 11(3), Nov. 28, 2017, pp. 269-282.

Varma et al., "Snuba: Automating Weak Supervision to Label Training Data", Proceedings of the VLDB Endowment, vol. 12, No. 3., 2018, pp. 223-236.

* cited by examiner

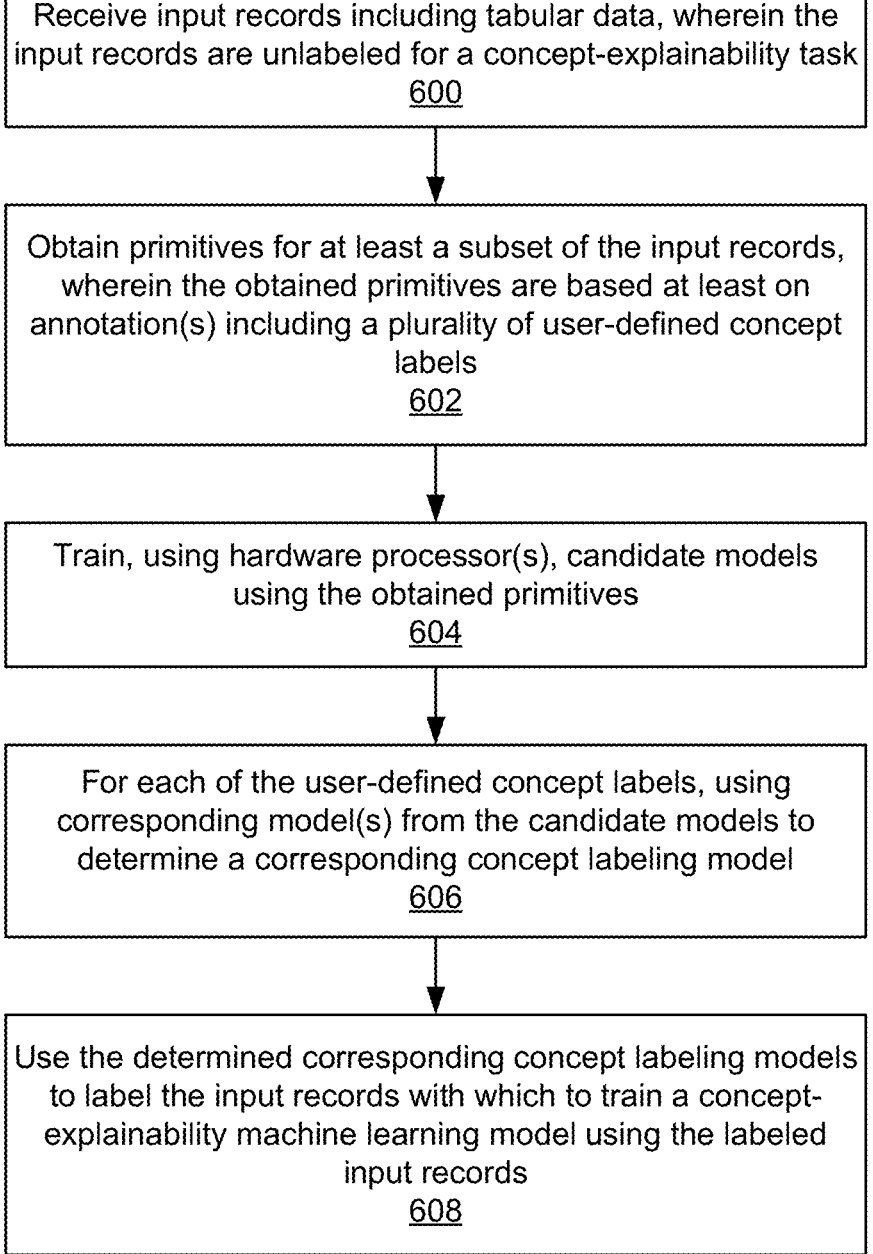

Receive input records including tabular data, wherein the input records are unlabeled for a concept-explainability task
600

Obtain primitives for at least a subset of the input records, wherein the obtained primitives are based at least on annotation(s) including a plurality of user-defined concept labels
602

Train, using hardware processor(s), candidate models using the obtained primitives
604

For each of the user-defined concept labels, using corresponding model(s) from the candidate models to determine a corresponding concept labeling model
606

Use the determined corresponding concept labeling models to label the input records with which to train a concept-explainability machine learning model using the labeled input records
608

FIG. 6

WEAK SUPERVISION FRAMEWORK FOR LEARNING TO LABEL CONCEPT EXPLANATIONS ON TABULAR DATA

CROSS REFERENCE TO OTHER APPLICATIONS

This application claims priority to U.S. Provisional Patent Application No. 63/274,197 entitled WEAK SUPERVISION FRAMEWORK FOR LEARNING TO LABEL CONCEPT EXPLANATIONS ON TABULAR DATA filed Nov. 1, 2021 which is incorporated herein by reference for all purposes.

This application claims priority to European Patent Application No. 22200139.8 entitled METHOD AND SYSTEM FOR GENERATING A CONCEPT LABEL MODEL TO LABEL A DATASET FOR TRAINING A HIERARCHICAL MULTI-TASK MACHINE LEARNING MODE filed Oct. 6, 2022 which is incorporated herein by reference for all purposes.

BACKGROUND OF THE INVENTION

Black box models are being increasingly used in artificial intelligence (AI). Typically, a black box AI model produces an output based on inputs and/or operations that are not visible to a user such as a data scientist or developer. The AI black-box paradigm has led to a growing demand for model explanations.

BRIEF DESCRIPTION OF THE DRAWINGS

Various embodiments of the invention are disclosed in the following detailed description and the accompanying drawings.

FIG. 6 is a flow diagram illustrating an embodiment of a process to label concept explanations on a tabular data.

DETAILED DESCRIPTION

Figure 1:
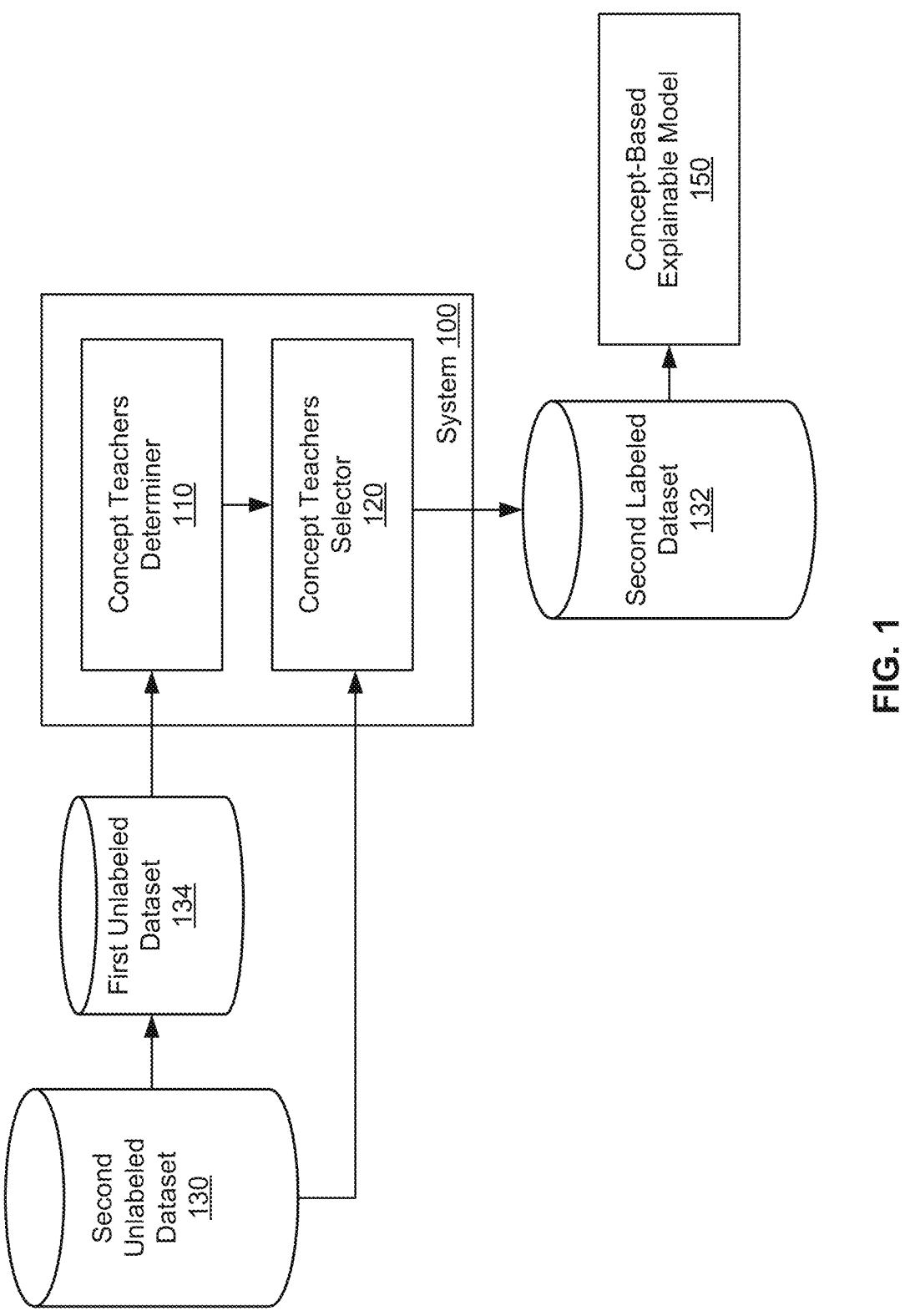
FIG. 1 is a block diagram illustrating an embodiment of a system for learning to label concept explanations on tabular data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention.

Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Concept-based explainability refers to methods addressing the information needs of humans-in-the-loop without technical knowledge in Machine Learning (ML), namely, for Explainable AI. It concerns the generation of high-level concept-based explanations, e.g., for a "Suspicious payment", rather than low-level explanations based on model features, e.g., "MCC=7801."

Concept-based explainability can be implemented through supervised learning by learning to predict concept labels. This explainability task is often combined with a main classification task using a multi-task learning approach. With this approach, both a classification (decision) and an explainability task (concept prediction) are learned jointly. However, multi-task learning requires a large volume of training data labeled on both tasks.

In this context, a concept is a semantic representation of the data instance that is relevant for a given classification task. For instance, "cough," "fever" and "loss of smell" could be relevant semantic concepts for the classification task of diagnosing a particular disease. For most computer vision and natural language processing applications, the annotation of concepts can be easily achieved by direct inspection of the data instances which are typically images or words/sentences. For instance, it is straightforward to identify the concept "stripes" on a picture of a zebra.

In tabular data, however, the instances are composed of an arbitrary number of numerical and/or categorical data columns. This makes it hard for a human to create a concise representation of a data instance. The task of annotating semantic concepts on a single instance can be unfeasible for most non-domain experts.

Manual concept labeling can become even more challenging for tabular data with some temporal structure, e.g., in a fraud detection use case. In this setting, some concepts can be associated with patterns identifiable only by observing previous data instances related to the instance to be labeled. Under these circumstances, human labeling becomes a task only possible for domain experts who are well acquainted with the data generation process including how class attributes and (high-level) data patterns appear in the data. To manually annotate concept labels on large-scale datasets is, therefore, a very expensive task both in terms of human resources and time.

Considering the high costs of manual labeling, an efficient solution is to label a small sample of the large-scale dataset and use that subset for the supervised task of concept interpretability. This approach, however, does not work well for learning Neural Network algorithms because they typically do not perform well when learning from very small datasets.

Weak supervision shifts the labeling problem from a manual task of annotating exact labels into a search for less precise (e.g., weak) labels, making it possible to be applied to the large-scale datasets. Weak supervision methods take advantage of domain knowledge combined with contextual information to generate weak labels automatically. When performed correctly, models trained with weak supervision perform better than models trained on very small human-labeled datasets.

Some conventional techniques are interactive and combine a set of human-defined Labeling Functions (LFs) into a generative model to create weak labels and associated confidences. Other conventional techniques, known as distant supervision methods, directly apply human-defined labeling functions to the unlabeled data to obtain the "weak" labels. The problem of concept label scarcity (a machine learning model trained with very few or incorrect labels does not perform well) can be addressed by applying distant supervision. Come conventional techniques directly map a set of binary features (corresponding to rule triggers in the original dataset) to the concept labels. Other conventional techniques combine distant labels with human annotated labels (provided by domain experts) into a hybrid learning strategy to train a final Neural Network model.

Despite increasing popularity in recent years, training concept-based explainers remains challenging in the tabular data setting due to concept label scarcity. Manually labeling concept explanations on tabular data can be laborious for non-experts, dramatically increasing the cost of training explainers.

Techniques for providing a weak supervision framework for learning to label concept explanations on tabular data are disclosed. In various embodiments, a concept label model is generated to label a dataset for training a concept-explainability machine learning model such as a hierarchical multi-task machine learning model. In various embodiments, domain expertise, application data, and ML techniques are used to train a group of ML models, dubbed Concept Teachers, that learn how to automatically label concept explanations. In various embodiments, a labeling model can be determined using a single-stage training process (base) or a multi-stage training procedure (Dependencies-Aware Concept Teacher Stacking (DACTS)). DACTS may be provides improved generalization ability because different concept and data dependencies are taken into account during the Concept Teachers training process.

FIG. 1 is a block diagram illustrating an embodiment of a system for learning to label concept explanations on tabular data. The system 100 includes a Concept Teachers determiner 110 and a Concept Teachers selector 120. The system 100 is configured to receive as input a first unlabeled dataset 134 and a second unlabeled dataset 130. The second unlabeled data is sometimes called a large dataset because it contains input records, while the first unlabeled dataset sometimes called a small dataset because it is based at least on a subset of input records. The system 100 is configured to determine one or more concept labels, for example labeling the input records of the second unlabeled dataset 130 to create a second labeled dataset 132. The labels can be used by a concept-based explainable model 150. An example of a concept-based explainable model is a hierarchical multi-task machine learning model, which is further described with respect to FIG. 7.

The Concept Teachers determiner 110 and the Concept Teachers selector 120 are configured to cooperate to determine a labeling model that performs a labeling task to predict the presence of concepts in a given dataset instance. For example, system 100 receives input records including tabular data. The Concept Teachers determiner 110 obtains primitives for a subset of the input records, where the obtained primitives are based at least on labeling function(s). The Concept Teachers determiner determines the primitives or receives pre-determined primitives or uses a combination thereof. The Concept Teachers determiner trains candidate models (teachers) using the obtained primitives. For each of the user-defined concept labels, the Concept Teachers selector 120 uses corresponding model(s) from the candidate models to determine a corresponding labeling model. In other words, the Concept Teacher selector selects one or more Concept Teachers from the determined Concept Teacher(s). The determined labeling model can be used to label input records (e.g., the input records corresponding to the large dataset) with which to train a hierarchical multi-task machine learning model.

In various embodiments, a concept-based weak supervision technique (sometimes called ConceptWeaSuL) combines domain knowledge, such as taxonomies, with existing data primitives, e.g., business rules, features, and labels of the main classification task, to train machine learning (ML) models for each concept label (sometimes called Concept Teachers). These models can be used to label large datasets for training concept-based explainers, e.g., via multi-task learning. Thus, solving the problem of automatic labeling of semantic concepts on tabular data for concept-based interpretability.

An example of an implementation of the disclosed framework for fraud detection is described herein but this is merely exemplary and not intended to be limiting as the disclosed techniques find application in a variety of contexts. In the described examples, the fraud detection system computes complex profiling features, temporal aggregations for a given entity of interest (such as a credit card and its transactional history), and other relevant engineered features that are fed to a ML model for fraud prediction. The fraud detection system includes a rules engine that triggers relevant business rules, such as testing if the limit of credit card money spent for a given time period is exceeded.

In various embodiments, the disclosed components are optimized to distinguish transactions of a certain type on a stream of transactions, wherein the stream of transactions are mostly of another type. This system may be integrated with a case management User Interface (UI) (such as Case Manager by Feedzai®) for real-time review of some selected subset of transactions. Review can be performed by domain experts, e.g., analysts, who can detect transactions of the type of interest by direct observation of the transaction information.

In various embodiments, a taxonomy of semantic concepts is defined. This taxonomy, sometimes referred to as a Concept Taxonomy, represents a complete set of logic predicates required by a human decision-maker for the execution of a classification task. The Concept Taxonomy can be defined by a domain expert, for example. In a fraud detection use case for example, a fraud analyst investigates if there are any fraud or legitimate patterns associated with at least one user-defined concept, when reviewing a transaction or a case.

In various embodiments, data instances, e.g., transactions or cases, are annotated with concepts from the Concept Taxonomy to create a small manually-labeled concept dataset. The annotations may be made by domain experts, e.g., fraud analysts. A set of labeling functions (e.g., created by the human experts) map data attributes, such as data features or business rules, to the set of concept labels. These labeling functions can be further transformed into concept-specific features in a subsequent machine learning pipeline.

In the example of a fraud detection use case, multiple signals present in the unlabeled large-scale dataset are used. Context for each of the transactions include, by way of non-limiting example: transaction data and fraud features; a fraud label of the transaction; fraud rules' triggers; and concept-specific features obtained from the labeling functions.

A small dataset of concept labeled transactions is used in ML models to learn how to label concepts as a supervised machine learning task. The trained ML models, sometimes called Concept Teachers, can then be used to generate weak concept labels on large-scale datasets. Although they may be imprecise, these weak concept labels may be useful for training concept-based explainers, e.g., through multi-task learning.

In an embodiment, the weak supervision disclosed method and system can be part of a concept-based explainability system. Referring again to the fraud detection example, the system shows, in a case management UI such as Case Manager by Feedzai®, the concept explanations along with the transaction information. From that point, a feedback loop that validates or corrects the concept explanations provided is created.

In an embodiment, the feedback is used as an expansion of the expert labeled dataset allowing for the Concept Teachers to be retrained to incorporate the new feedback. The weak supervision framework can be understood as an ever-growing source of concept knowledge for the main classification task, e.g., fraud detection.

In an embodiment, depending on the labeling quality obtained, the Concept Teachers are used as data explainers, independently from the decision task. This could have various applications ranging from understanding data to fraud pattern monitoring.

The disclosure includes a weak supervision technique for concept labeling on tabular data to train concept-based explainers.

Concept-based interpretability methods for tabular data typically require large datasets to be annotated with relevant semantic concepts. In the case of fraud detection, these concepts may represent fraud patterns or risky behaviours such as high velocity of transactions or malformations in customer inserted information, e.g., shipping addresses. To overcome the high cost of manually annotating tabular data with relevant concepts, techniques for weak supervision tailored for automatic concept labeling in tabular data are disclosed.

Figure 2:
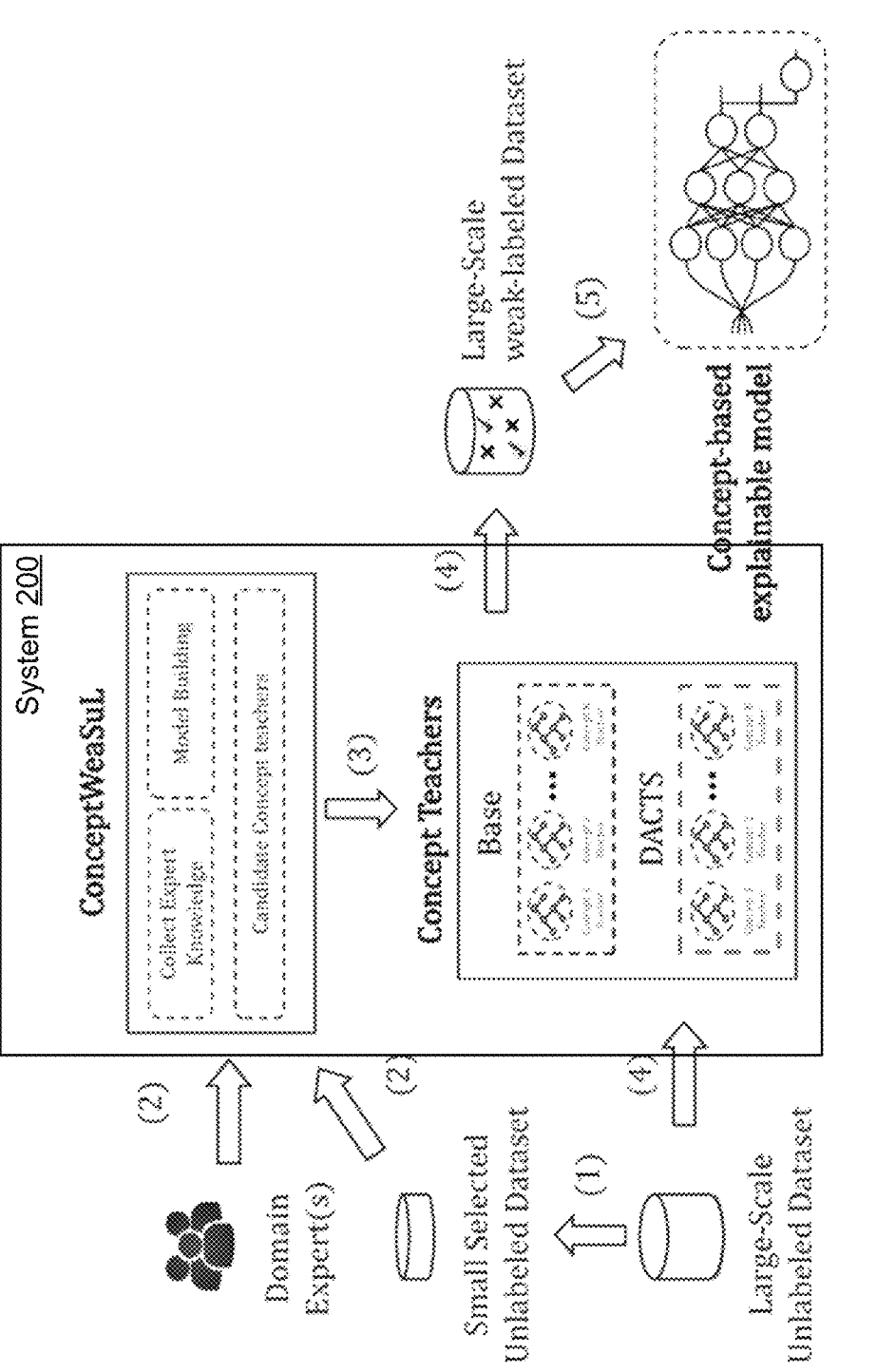
FIG. 2 is a block diagram illustrating an embodiment of a system for learning to label concept explanations on tabular data.

FIG. 2 is a block diagram illustrating an embodiment of a system for learning to label concept explanations on tabular data. The system 200 is an example of system 100 of FIG. 1. (1) A small set of instances (an example of which is the first unlabeled dataset 134) is selected from a large-scale unlabeled dataset (an example of which is the second unlabeled dataset 130). (2) ConceptWeaSul receives, as input, information from at least one Domain Expert and the small subset of selected instances. (3) Concept Teachers (two different types in this example) are created. In various embodiments, each type of Concept Teacher differs in complexity. A first type of Concept Teacher is Base Concept Teachers (Base), and a second type of Concept Teacher is Dependencies-Aware Concept Teacher Stacking (DACTS). (4) One or more of the Concept Teachers can be used to generate concept labels on a large-scale unlabeled dataset. (5) The generated large-scale dataset can then be used for training a Concept-based explainable model.

Figure 3:
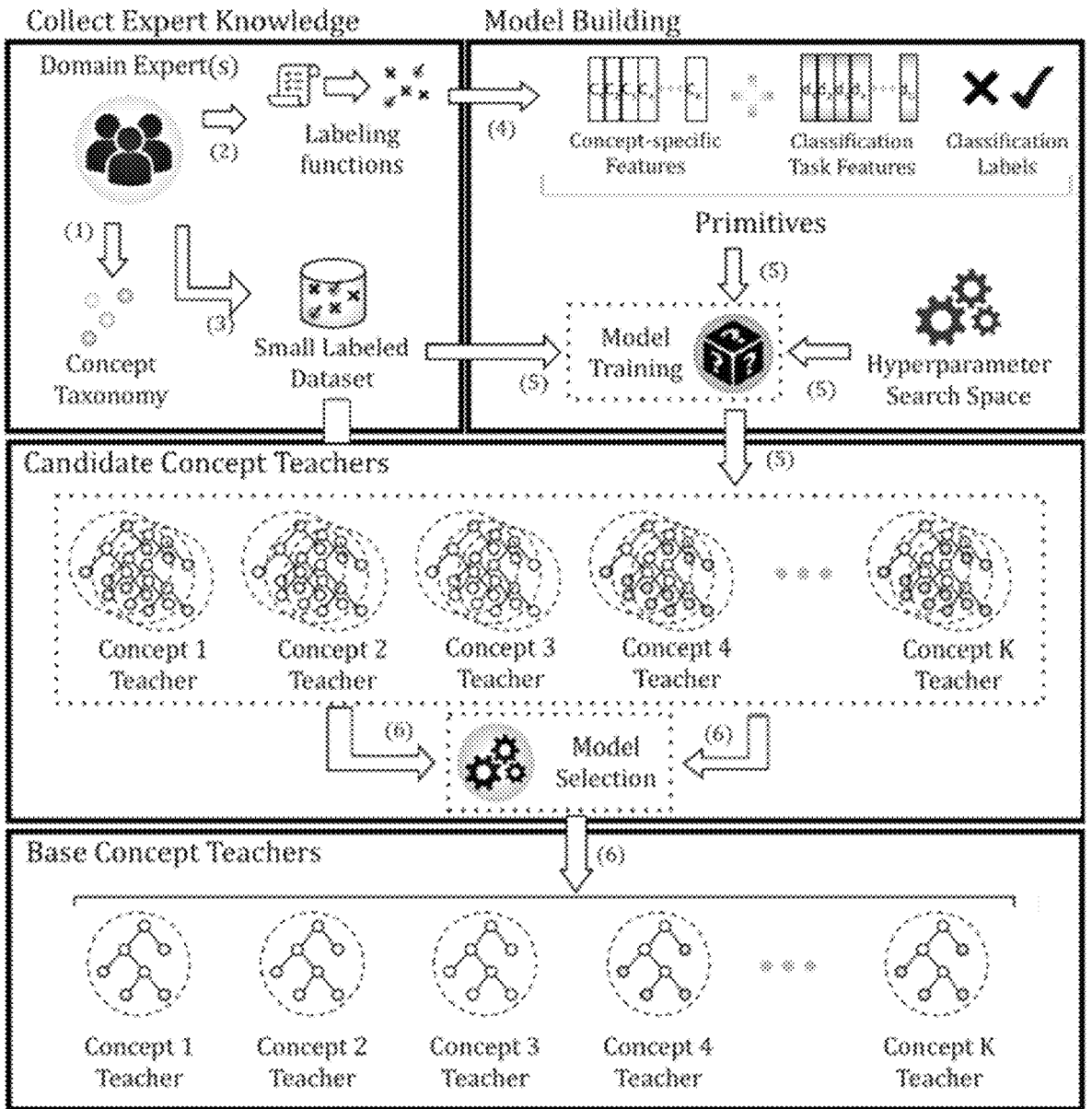
FIG. 3 is a block diagram illustrating an embodiment of a system including single-stage Concept Teachers for learning to label concept explanations on tabular data.

FIG. 3 is a block diagram illustrating an embodiment of a system including single-stage Concept Teachers for learning to label concept explanations on tabular data. Each of the components are like their counterparts in FIG. 2 unless otherwise described herein.

The Domain Expert(s): (1) define a concept taxonomy; (2) create a set of labeling functions (which use the available primitives in the data to generate concept labels); (3) annotate a small dataset with concept labels. As used herein, a Domain Expert refers to any person or computer processor having domain knowledge, such as a:

Human Classifier who performs the main classification task by direct inspection of the instances in the dataset. The expert's performance should be at least as good as a ML classifier;

Domain Knowledge: obtained based on a clear mental model of most of the human-understandable concepts associated with the different classification classes. These (mental) representations reflect expert's reasoning during the decision process;

Concept Recognition: Should be capable of identifying the presence of one or more of those human-understandable concepts in specific instances of the dataset.

Herein the annotation types used throughout the learning process are referred as decision (or class) labels, and concept (or explainability) labels.

In various embodiments, Domain Experts are relied upon to define a Concept Taxonomy which includes known concepts and corresponding human interpretable definitions. For example, the defined concepts encode the most common high-level patterns used in the domain experts' thought process when manually classifying the data instances. The Concept Taxonomy associates each of the concepts defined with a classification label. For instance, in the fraud use case, some concepts are associated with fraudulent behaviour, and others with legitimate behaviour.

In various embodiments, the domain experts create a set of labeling functions based on the expert's reasoning. For example, a labeling function maps one or more data primitives (e.g., features, labels or other information associated with the data instances) to one or more human understandable concepts. These labeling functions may be used to produce concept-specific features.

The domain experts manually label a small dataset of selected instances (3). The selection is optionally performed using predictions of a ML classifier previously trained on the main classification task. The instances can for example be selected through one or more Active Learning criteria or randomly sampled. In a binary detection example, the instances can be selected closer to the detection decision boundary defined by a target False Positive Rate (FPR), or any other target metric. The target budget for the number selected instances can be defined according to what is deemed feasible by analysts (e.g., domain experts) to label with the available time.

In an embodiment, the same environment being used by analysts to perform their analysis such as a case management UI, can be used for the collection of concept labels.

After the expert labeling is performed, optionally a set of Unidentified/Other concepts are added to the Concept Taxonomy for each of the decision classes, and these new concept labels are assigned to the instances with no concepts associated. This may be advantageous because it makes the Concept Taxonomy more complete, and therefore improves concept-based interpretability.

The collected expert knowledge can be used to train a set of Machine Learning models which are referred to as Concept Teachers as follows. (4) The labeling functions are converted into concept-specific features; (5) the small dataset is split into a training set and a test set. In various embodiments, one or more Candidate Teachers, (e.g., one group for each concept), are trained using Random Search on the Hyperparameter Space and combinations of Primitives. To train the Concept Teachers the hyperparameters are tuned for the best performing set of Concept Teachers from a grid of hyperparameter combinations and ML algorithms. The model hyperparameters are selected randomly and the labeling performance is evaluated on the test set. The best hyperparameter combination is selected independently for each of the concepts, meaning that two concepts can have teachers with different ML algorithms and parameters.

In various embodiments, the Concept Teachers are trained using the large-scale unlabeled dataset attributes, herein referred to as primitives, domain expert labeling, and output class labeling. In a fraud detection example, primitives may include: fraud features, a fraud label, rules triggered by a fraud detection system and the labeling functions, defined by the domain experts, and that can be converted into concept-specific features.

In various embodiments, concept-specific features are generated from counting the number of labeling functions that positively label the corresponding concept in a given instance. Other approaches that can be used include performing some feature engineering targeting specific concepts on the Concept Taxonomy. In the fraud detection example, features may be defined by fraud analysts and/or data scientists that are more salient for transactions with a presence of a specific concept.

In various embodiments, classification task features include information used and/or produced by the main classification task system. In a fraud detection example, the fraud features, which consider the past temporal behaviour of some of the transaction entities, and fraud rules are triggered during the system's decision process. It is assumed that the historical data already went through a decision system.

In various embodiments, a classification label is included as a primitive for the Concept Teachers. This enables the concepts to be identified as positively or negatively associated with the decision classes. Experiments show that the usage of the decision label improves the performance of the Concept Teachers.

(6) The Base Concept Teachers are selected to be the best performing on the test set. In other words, the best performing candidate teachers are selected as the Base Concept Teachers. To create the Concept Teachers, the human annotated dataset is used and split into train and test for assessing labeling performance. The task of the Concept Teachers is to predict the presence of concepts in a given dataset instance. This labeling task is a multi-label prediction since the presence of concepts is not mutually exclusive.

Two approaches are disclosed for tackling the multi-label problem: Base Concept Teachers and Dependencies-Aware Concept Teacher Stacking (DACTS).

The first approach, the Base Concept Teachers (which is shown in this example), is a simpler approach and includes training the Concept Teachers by Binary Relevance (BR)

where an individual teacher is trained per each of the K concepts. Hyperparameter optimization for each of the BR teachers was performed. The final set of teachers is selected to be the best performing, concept-wise, on the expert annotated test set. This performance is measured as area under the ROC curve because it is a threshold-free metric that captures the teacher performance. However, other performance metrics could be used.

Base Concept teachers might not exploit all the valuable information about possible correlation between concepts labels. Therefore, a Dependencies-Aware Concept Teacher Stacking (DACTS), which takes concept dependencies into consideration, may be added to the framework, as shown in the next figure.

Figure 4:
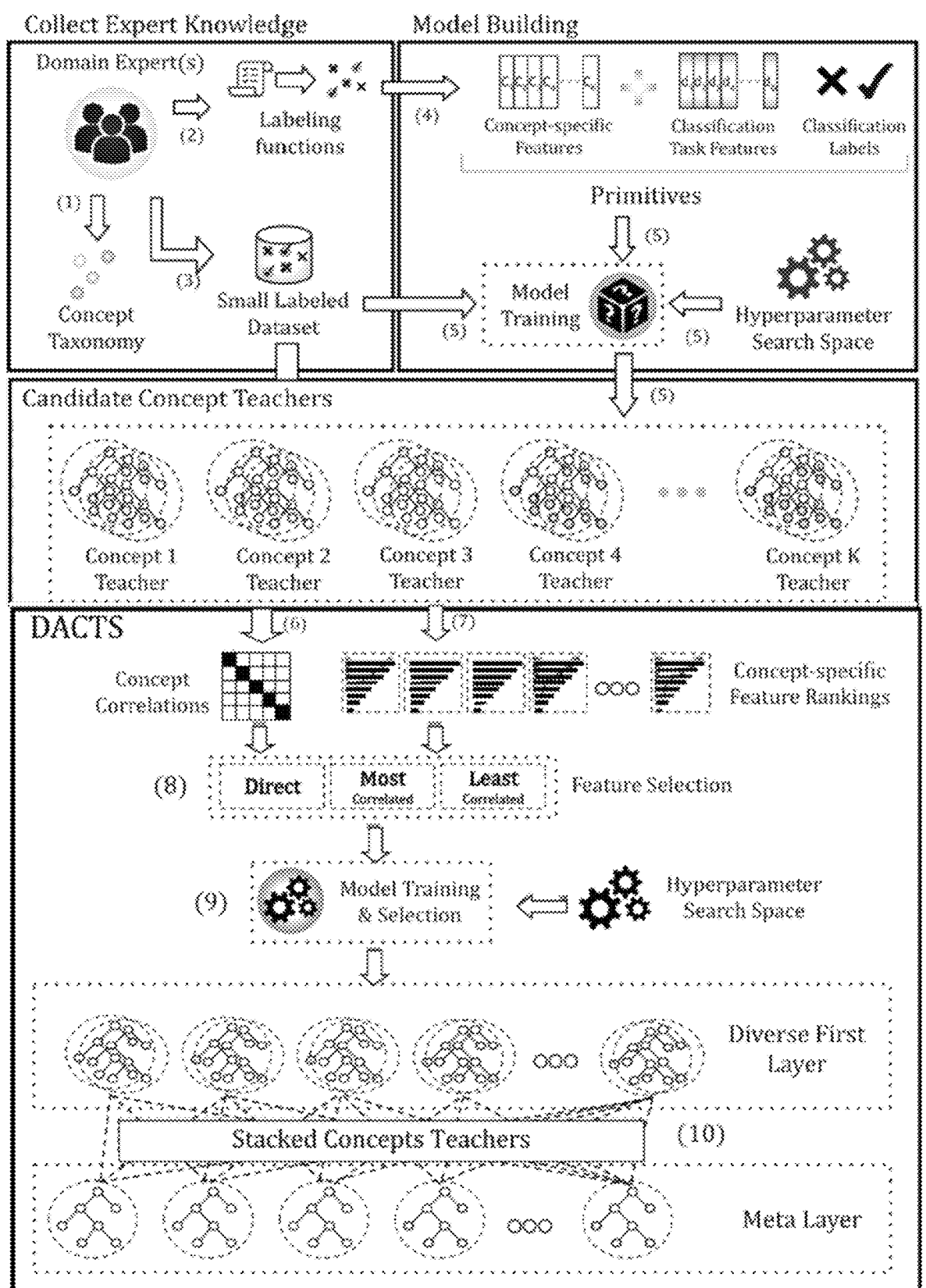
FIG. 4 is a block diagram illustrating an embodiment of a system including two-stage Concept Teachers for learning to label concept explanations on tabular data.

FIG. 4 is a block diagram illustrating an embodiment of a system including two-stage Concept Teachers for learning to label concept explanations on tabular data. Each of the components are like their counterparts in FIG. 3 unless otherwise described. For example, (1)-(5) are the same as for Base Concept Teachers described in FIG. 2. DACTS is a stacking method composed of two layers. In the first layer a set of Concept Teachers is obtained that is both the most diverse in terms of inductive biases and the best performing on the hold out set. The Concept Teachers are used to train the meta layer. With the meta layer, it is found (i) the best generalization over the diversity of the first layer and (ii) exploited the concept dependencies by fitting each Concept Teacher using the predictions for all the other concepts from the first layer.

(6) Concept label correlations are obtained from the labeled dataset. The pairwise correlations between all concepts in the concept taxonomy are computed using the dataset of labels obtained from the domain experts. The correlation methods used can be linear (Pearson Correlation), rank-based (Spearman correlation), or other more advanced nonlinear correlation methods. The resulting pairwise correlation matrix is used to generate the feature selection sets.

(7) Concept-specific feature importance rankings are obtained from the Candidate Concept Teachers. In an embodiment, before generating the feature selection sets, it is computed the concept-specific feature importance from the Candidate Concept Teachers. Because these Concept Teachers can differ in various aspects such as the ML algorithms used, the resulting feature rankings can vary within the top performing candidate teachers. To obtain a stable estimate of the feature importance rankings, an average of the relative importance across the best performing candidate teachers for each concept is computed. This provides a set of K different rankings of the complete list of features, including also the features originated from the labeling functions and the main decision task label. In various embodiments, the information obtained in this step includes the most important features for predicting concept k should appear first in the k-th ranking of features.

(8) One or more (e.g., 3) different sets of features selections are obtained for each concept. The diversity of the first layer is an important aspect of the stacking ensemble. To obtain a diverse set of input sources the K rankings of features are used to generate 3 diverse sets of feature selections. Using the concept correlation matrix, the m most and the m least associated concepts are found for each of the K concepts, wherein m is an adjustable parameter. Then, 3 groups of feature selections are created:

Directly Associated Features: features for each of the concepts using directly their corresponding feature importance ranking;

Features Most Correlated Concepts: features from the rankings of the m concepts most correlated with the concept to be predicted;

Features Least Correlated Concepts: The features are selected using the rankings of the m concepts least correlated with the concept to be predicted.

The selections are performed by setting a cut-off percentage of the cumulative importance in the relative feature importance ranking. More exactly, for a cut-off percentage of x %, the topmost important features in the ranking until the cumulative percentage of relative importance reaches x % is selected. x is another adjustable parameter in the framework. For the second and the third groups of feature selections, a cut-off selection on m rankings is performed and merges the m resulting sets into a final set through a union operation. This feature selection is performed for each of the concepts, resulting into 3 feature sets for each concept.

In another embodiment, the cut-off parameter x is varied and produce 3×v feature sets for each concept, where v is the number of cut-off points used.

In various embodiments, the dataset is split before proceeding to model training and selection. That is, the human labeled training set is split prior to training the diverse first layer. The two resulting sets are used to train the first and the meta layers, respectively. The splitting percentage can be varied to values different from 50%. Experiments show that performance may be improved when the first set to takes a larger percentage than the second set, e.g., the first set is larger than the second set.

(9) A diverse group of Concept Teachers is trained on various combinations of parameters and feature selection sets, a selection of the best performing and least correlated (in terms of predictions) is performed to form the Diverse First Layer. For the first layer of the stacking, first the N teachers are trained for each of the K concepts. Within the N models not only the hyperparameters and algorithms, as for the Simple Concept teachers, must vary, but also the feature sets obtained in the previous step. The random sample of hyperparameters and algorithms must be equally balanced between feature sets, meaning that all the different feature sets must have the same number of algorithm and parameter combinations. All the N×K models obtained are used to score the large-scale unlabeled dataset. Next, a teacher selection is performed by optimizing the following factors: (1) maximize the teacher performances on the second training set, used to train the meta layer; (2) minimize the teacher prediction correlations on the concept unlabeled set. The prediction correlations can be obtained from linear correlation or more advanced correlation methods. For each concept, subsets of n teachers from the N teachers trained are selected. The selected teachers compose the first stacking layer. Finally, this layer's teachers are used to score the meta training set obtaining n scores for each of the K concept labels.

A training set for the Meta Layer of teachers (called a meta training set) can be formed in a variety of ways. In various embodiments, the meta training set is the test set obtained by splitting the small dataset into a training set and a test set as described with respect to (5) of FIG. 2. For example, the small dataset is split into three disjoint sets: one set for training of diverse layer, one set for training of the meta layer, and one test set. The diverse layer can be trained on its corresponding training set, and outputs of the diverse layer are generated onto the training set of the meta layer. The meta layer is then trained on its corresponding training set. As another example, the training set is not split, so there is a single training set and a single test set. The diverse layer is trained on the training set and the outputs of the diverse layer are generated on this same training set. The meta layer is then trained using the training set with the outputs of the diverse layer.

(10) A Meta Layer of teachers is trained on the meta training set, which is scored by the First Layer. To exploit concept dependencies, the predictions for all concepts are input as predictors for each concept. To build the meta stacking layer, K teachers (one per concept) are trained on the meta training set. Preferably, a key aspect of this stacking is that each teacher in the meta layer must use the same list of predictions from the first layer. Meaning that the meta teacher for concept 1 receives the first layer predictions not only for concept 1 but also for concepts 2 to K. This allows for the meta teachers to both consider the correlations between concepts and, at the same time, generalize over the diversity of the different inductive biases and input sources from the first layer.

In another embodiment, the original inputs used for the first layer are added to the inputs of the meta layer.

After training Concept Teachers with any of the two approaches, e.g., base and DACTS, concept labels are obtained based on the prediction scores. Two example thresholding techniques (equalizing prevalences and using a target metric) that generate binary labels from the numerical score values will be described. These thresholding approaches are merely exemplary and not intended to be limiting as other thresholding approaches may be used.

An objective of equalizing prevalences is to generate concept labels with the same prevalences as the ones of the whole (entire) human labeled dataset. For example, first those prevalences in the human labeled set are computed, and then the score predictions on the whole large-scale unlabeled dataset are thresholded to match those prevalences.

An objective of using a target metric is to control the labeling error estimated from the test set of the human labeled set. For example, the concept prediction thresholds are computed using some target metric. For instance, False Positive Rate (FPR) can be used to control the amount of false positive labels generated or True Positive Rate (TPR) to assert that at least a given percentage of labels is generated correctly. The set of K thresholds obtained is then applied to the prediction scores on the large-scale unlabeled set to obtain the final concept labels.

In various embodiments, domain expert knowledge and machine learning capabilities are leveraged to train concept-specific labelers, also called Concept Teachers. These labelers are used to label concepts on large tabular datasets to serve as training data for concept-based explanation models.

Figure 5:
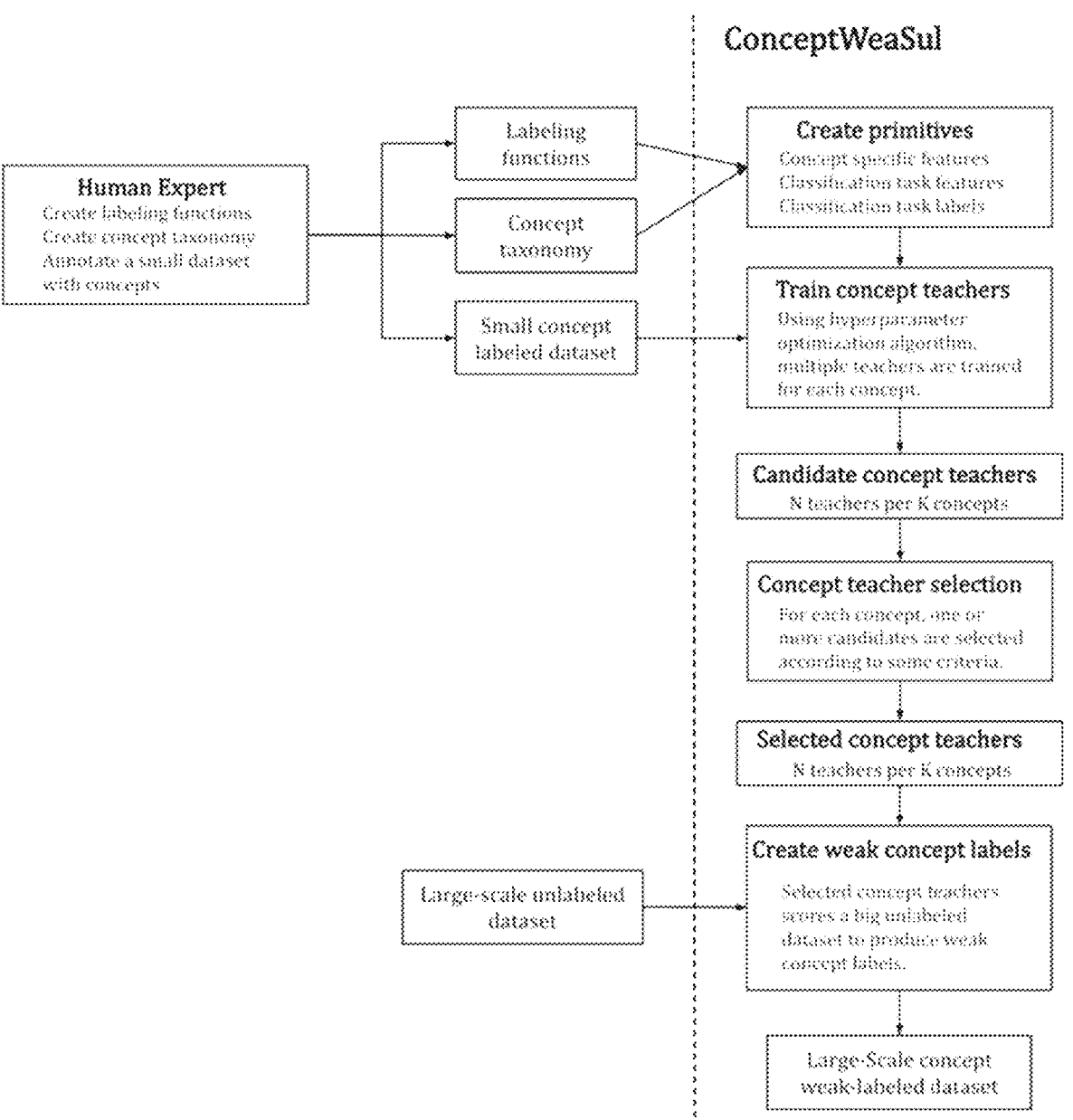
FIG. 5 is a flow diagram illustrating an embodiment of a process to generate a labeled dataset.

FIG. 5 is a flow diagram illustrating an embodiment of a process to generate a labeled dataset. The process will be described using an example of fraud detection. An example use case of fraud detection will now be described to aid in understanding the disclosed techniques. The parameters and configurations are examples of what could be used in the framework.

For the experiments, a real-world e-commerce fraud detection dataset was used. This dataset includes more than five million transactions with associated fraud labels obtained from ground truth evidence, such as charge-backs and direct contact from/to card holders.

The Concept Taxonomy was created by a group of professional fraud analysts with deep knowledge of the fraud patterns most prevalent in this e-commerce fraud scenario. Some of the concepts are associated with fraudulent behaviour, and others with legitimate behaviour. In this setting, concept labels can co-occur and in the case of multiple concepts, they can also have conflicting concepts with regards to their fraudulent/legitimate association.

Next, the expert concept annotations were collected on a dataset of approximately 3,000 instances. These instances were selected from a large-scale historical dataset following the criteria of closeness to the decision boundary of a previously built fraud detection ML model. This decision boundary was defined by setting a target FPR of 5% on a separate validation set. On this small set, the same group of professional fraud analysts conducted their everyday analysis trying to correctly predict the fraud label of the historical transactions. At the end of the analysis, and after the fraud prediction was provided, analysts were asked to identify whether any concepts from the defined taxonomy were present.

In the fraud datasets, there are the original data features (developed for a real-time fraud detection ML model) and the set of triggered rules that aid in that real-time fraud detection system. The domain experts defined a set of simple concept labeling functions using those rule triggers. This resulted in a set of more than 300 simple labeling functions. These were then converted into concept-specific features by counting the number of rules that mapped to each of the concepts in a given transaction.

TABLE 1

| Simple labeling function example | |
| --- | --- |
| Triggered rule | Mapped concepts |
| Order contains risky product styles. | Suspicious Items |
| User tried n different cards last week. | Suspicious Customer, Suspicious Payment |

Both the human labeled dataset and the large-scale concept-unlabeled dataset were split into a training set and a test set. The two datasets contain transactions in overlapping time periods and the splits were performed in same time instants so that the human-labeled sets have the same temporal span as the concept-unlabeled sets.

As input for the Concept Teachers, input combinations from the four sources: fraud detection features (profiles and other), rule triggers, concept-specific features obtained from the labeling functions, and the fraud label were used.

A set of Concept Teachers using the simple procedure was created. Both Feed Forward Neural Networks and Random Forest algorithms were considered for the hyperparameter optimization. An optimization using random search on both algorithms was performed. For random forests, the number of trees was varied between [100; 1000], the minimum instances to split between [2; 20] and the minimum leaf instances between [1; 19]. For the neural networks the number of hidden layers between was varied between [4; 9], the layer sizes between [32; 1024], the learning rate between [0:0001; 0:005] and the dropout probabilities for all the hidden layers between [0:1; 0:5]. The search was performed in the following way: (1) a set of parameters is sampled; (2) teachers for all K concepts are trained using the sampled set of parameters; (3) the K teachers are evaluated using the same test set. 250 models on both random forests and feed-forward neural networks were trained. The teachers with the best test performances for each of the K concepts were selected.

For the stacking ensemble, 5 sets of feature selections for each of the 3 groups were created using the cut-off percentages of {50%; 75%; 90%; 95%; 99%} totaling 15 sets of features for each concept.

Finally, Concept Teachers using Random Forests, Feed Forward Neural Networks, Support Vector Machines, Logistic Regressions, and LightGBM models were trained on the 15 sets of features obtained during selection. Additionally, a short hyperparameter optimization on each of these 75 configurations with 50 runs each was performed. The best performing models on each of the 75 configurations were selected. The selected models moved forward to the final optimized selection which minimizes prediction correlations on the unlabeled set and maximizes performance on the meta layer training set.

With the first layer complete, it is followed by a meta layer where a Random Forest model was trained on the meta training set using the predictions of the first layer teachers. The parameters used were the ones of the best Random Forest models obtained by the simple approach.

Finally, the obtained stacked Concept Teachers were used to generate the concept labels on the largescale concept unlabeled dataset of 5 million transactions. To obtain binary labels from the scores, an equalizing prevalence method was applied. Finally, an additional concept ("Other Fraud") was introduced to label the fraudulent transactions which did not have any concept label identified by the teachers.

The next figure shows a more general version of the process described in FIG. 5.

FIG. 6 is a flow diagram illustrating an embodiment of a process to label concept explanations on a tabular data. This process may be implemented on system 600 of FIG. 1.

In the example shown, the process begins by receiving input records including tabular data, wherein the input records are unlabeled for a concept-explainability task (600). The input records can be used to form subsets of records (e.g., a small dataset and a large dataset), and/or split into sets of data (e.g., a set of training data and a set of test data). When creating a first (e.g., small) dataset and a second (e.g., large) dataset, the second dataset may have more records than the first dataset, while both datasets have the same fields. In various embodiments, one or more input records do not have concept labels. For example, they may have main (e.g., decision labels) but not labels indicating the associated concept.

The process obtains primitives (602) for at least a subset of the input records, wherein the obtained primitives are based at least on at least one annotation including a plurality of user-defined concept labels. In various embodiments, the primitives are based on one or more of the following: a heuristic, a manual label annotation, a concept primitive, or a feature of an upstream machine learning model (e.g., a fraud model).

The process trains, using one or more hardware processors, a plurality of candidate models using the obtained primitives (604). Primitives may be obtained based on a labeling function and/or a concept taxonomy. As described herein, the labeling function and/or concept taxonomy may be user-defined by domain experts. Annotation(s) for obtaining primitives may be arranged according to the concept taxonomy.

In various embodiments, the primitives are based on user-defined concept labels for obtaining primitives correspond to labels for records of the first (e.g., small) dataset. Annotation(s) for obtaining primitives are determined for the first (e.g., small) dataset. For example, annotation(s) are determined based on applying at least one labeling function to the records of the first dataset. The annotation(s) may include concept-specific counts of the user-defined concept labels. The concept-specific counts can be determined by applying the labeling function(s) to record(s) of the first dataset. As another example, annotation(s) are determined based on labeling unannotated records as unlabeled in response to a determination that a record of the first dataset does not have a user-defined concept label.

In various embodiments, the candidate models are trained using the obtained primitives based at least on randomly selected hyperparameters from a predetermined range. The candidate models may include a first candidate model corresponding to a first concept label and a second candidate model corresponding to a second concept label. Referring to FIG. 3, Concept 1 Teacher shows a group of candidate models for a first concept label and Concept 2 Teacher shows a group of candidate models for a second concept label. In various embodiments, training the candidate models includes using a combination of hyperparameters, where the hyperparameters are independently selected for the first candidate model and the second candidate model.

In various embodiments, training features are ranked by averaging feature importance across the candidate models, and the candidate models are trained using the ranked training features.

The process uses at least one corresponding model from the plurality of candidate models to determine a corresponding concept labeling model for each of the plurality of user-defined concept labels (606). For example, in the base embodiment (FIG. 3), using the corresponding model(s) is selecting the model according to a predetermined metric.

As described herein, in the DACTS embodiment (FIG. 4) the labeling model can be determined using a multi-stage training procedure such as DACTS. For example, the corresponding labeling model includes a diversity layer and a generalization layer obtained as further described herein. Using the at least one corresponding model from the plurality of candidate models to determine the corresponding labeling model includes determining at least one concept correlation for the plurality of user-defined concept labels, selecting features based at least on the determined at least one concept correlation, and obtaining a diversity layer including by training, using the one or more hardware processors, the plurality of candidate models using the selected features. A generalization layer is obtained by training the plurality of candidate models using the obtained primitives and the diversity layer. In various embodiments, the process includes training the generalization layer including by utilizing an output of the diversity layer as input to the generalization layer.

In various embodiments, determining the at least one concept correlation for the plurality of user-defined concept labels is based at least on a pairwise correlation matrix between each pair of user-defined concept labels in respect of occurrences for a same record of a first dataset, the first dataset being based at least on a subset of the input records. Features selection can be based on at least one of: a predetermined number of the best ranked (performing) features for each of the at least one user-defined concept label, a subset of the plurality of user-defined concept labels that are the most correlated (e.g., above a threshold), or a subset of the plurality of user-defined concept labels that are the least correlated (e.g., below a threshold).

The process uses the determined corresponding labeling models to label the input records with which to train a concept-explainability machine learning model using the labeled input records (608). An example of a concept-explainability machine learning model is a hierarchical multi-task machine learning model that may be configured to perform both a decision task to predict a decision result and an explanation task to predict a plurality of semantic concepts for explainability associated with the decision task. A semantic layer of the hierarchical multi-task machine learning model is associated with the explanation task is utilized as an input to a subsequent decision layer of the hierarchical multi-task machine learning model associated with the decision task. An example of a hierarchical multi-task machine learning model is shown in the following figure.

Figure 7:
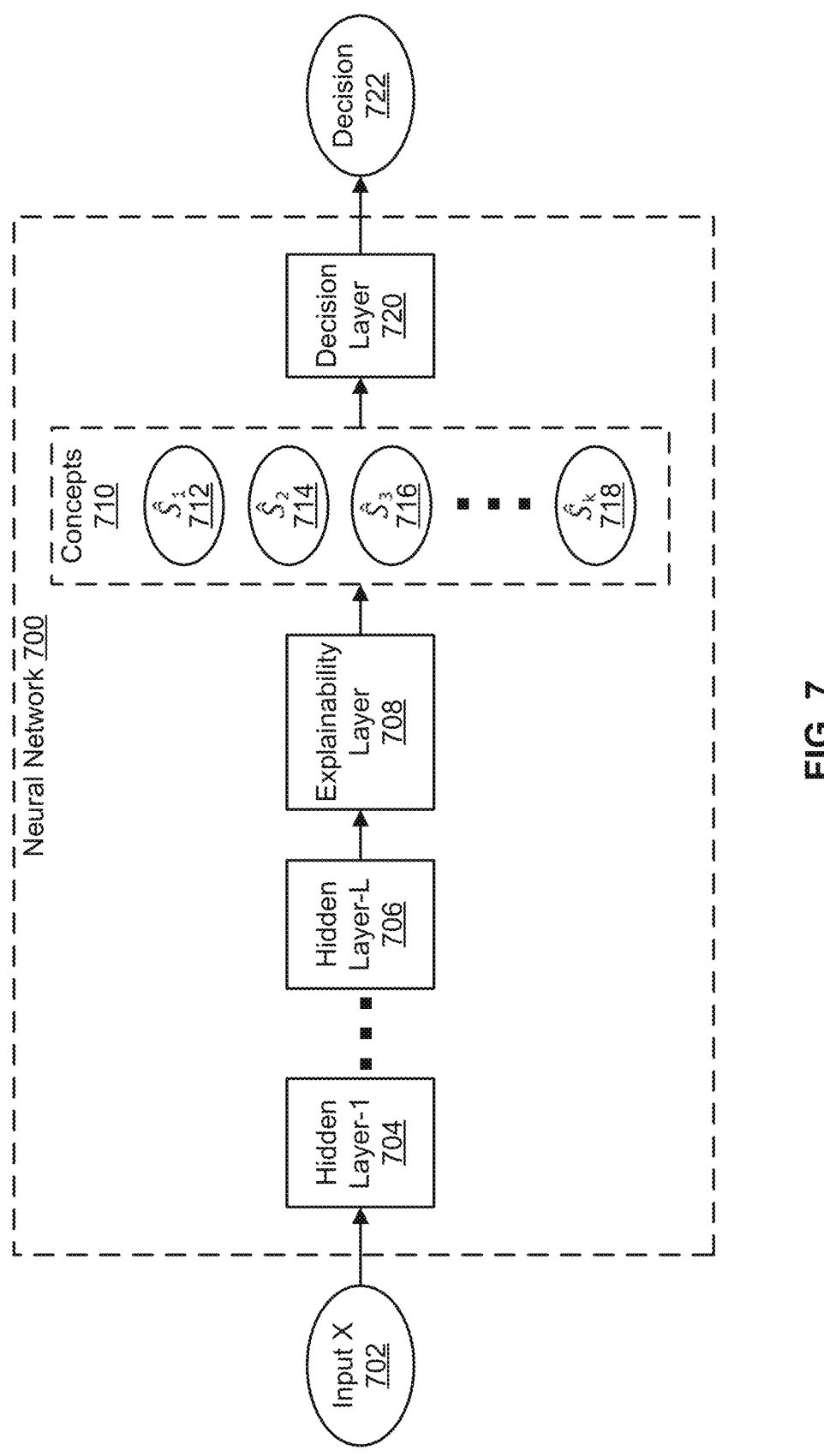
FIG. 7 is a block diagram illustrating an embodiment of a machine learning model architecture for performing both a decision task and an explanation task.

FIG. 7 is a block diagram illustrating an embodiment of a machine learning model architecture for performing both a decision task and an explanation task. In the example illustrated, neural network 700 receives input X 702 and outputs decision 722 related to a decision task. Neural network 700 also generates concepts 710, which correspond to an explanation task of producing semantic concepts 712, 714, 716, . . . , 718 used as explanations associated with the decision task. In various embodiments, concepts 710 is part of the output of neural network 700 (along with decision 722). As described in further detail below, in the example illustrated, concepts 710 are the input to decision layer 720 of neural network 700.

Neural network 700 is configured to jointly learn to perform a decision task and provide associated domain knowledge explanations. Semantic concepts (used as explanations) help domain experts (end-users) with reasoning related to their decision-making process. Domain experts may provide feedback about which concepts justify their decisions. Thus, the techniques disclosed herein allow for continuously improving both predictive accuracy and explainability. In some embodiments, neural network 700 comprises a neural network (NN). This is merely illustrative and not restrictive. The techniques disclosed herein can also be implemented with different (or an ensemble of) machine learning models. For example, a multi-labeling ensemble model followed by a decision task model with the multi-labeling predictions as the only inputs to the decision task model may be utilized. Utilizing both semantic concepts and decision labels in a machine learning model can be framed as finding a hypothesis (learner), $h \in H$, such that, for the same inputs, $x \in X$, h is able to simultaneously satisfy $h:X \rightarrow Y$ and $h:X \rightarrow S$, where S is the set of semantic concepts, and Y is the set of decisions (or classes) of the decision task. The decision task is also referred to herein as the predictive task. The explanation task is also referred to herein as the explainability task.

In the example illustrated, neural network 700 comprises three building blocks: (1) neural network (NN) layers (hidden layer-1 704 to hidden layer-L 706), (2) a semantic layer (explainability layer 108), and (3) a decision layer (decision layer 720). In the example illustrated, neural network 700 is a hierarchical machine learning model in that the blocks are chained sequentially. Stated alternatively, outputs of an L-layer NN are fed as inputs to a semantic layer whose outputs are in turn fed into a decision layer. Both the decision task and the explainability task share parameters of the initial layers (the hidden layers) but also have specialized output layers for each individual task. The hierarchy shown in the output layers exploits the explainability task carrying pertinent information to the decision layer that is not explicit in the input data. In various embodiments, input X 702 is a vector X of numerical values. For example, with respect to fraud detection (an example application of the techniques disclosed herein that will be referred to repeatedly herein for illustrative purposes), X may comprise various values associated with a transaction to be determined (decided) as either fraudulent or not fraudulent (e.g., purchase amount for the transaction, total purchase amounts for other transactions by a same purchaser in a specified period of time, time between recent purchases, etc.). Non-numerical features may be converted to numerical values and included in input X 702. For example, whether a billing address associated with the transaction matches a known billing address on file can be represented as 0 for no and 1 for yes. It is also possible for input X 702 to include non-numerical values, such as the billing address. In various embodiments, each layer of neural network 700 (e.g., hidden layer-1 704 through hidden layer-L 706, explainability layer 708, and decision layer 720) is a structure that takes information from a previous layer and/or passes information to a next layer. Various types of neural network layers may be used, such as fully-connected layers with rectified linear unit (ReLU) or other activation functions. In various embodiments, in addition to decision 722 (which can be written as $\hat{Y}$) provided by neural network 700 as an output of decision layer 720, concepts 710 (which can be written as $\hat{S}$) are also provided by neural network 700 as outputs of explainability layer 708.

With respect to fraud detection, an example of decision 722 is an output that includes a score between 0.0 and 1.0, which can then result in a 0 or 1 output based on a score threshold. This can be interpreted as a yes or no determination as to whether a particular transaction is likely to be fraudulent. In the example shown, concepts 710 are comprised of a plurality of semantic concept predictions $\hat{S}_1$ 112, $\hat{S}_2$ 114, $\hat{S}_3$ 116, ... $\hat{S}_k$ 118. With respect to fraud detection, each semantic concept prediction may be a score between 0.0 and 1.0 representing a probability of a specific fraud concept being present, such as suspicious billing address, suspicious customer, suspicious payment, suspicious items, high speed ordering, suspicious email, suspicious Internet Protocol (IP) address, and so forth. Predictive scores (e.g., likelihood scores between 0.0 and 1.0) can result in yes or no determinations based on score thresholds. In some embodiments, each yes or no determination is based on whether a corresponding likelihood score exceeds a specified threshold (e.g., 0.5 on a scale of 0 to 1). The example illustrated is a multi-task machine learning model because in addition to predicting a decision result (e.g., a determination that fraud exists/is likely), semantic concepts associated with explaining the decision result (e.g., suspicious billing address, suspicious customer, suspicious payment, etc., to explain why fraud is likely). By chaining semantic and decision layers (explainability layer 708 and decision layer 720), external information about the domain (e.g., fraud detection) which is not available in the feature data (input X 702) can be encoded. This is particularly meaningful when the taxonomy of semantic concepts is closely related to the decision task (e.g., a fraud taxonomy of fraudulent patterns can be very correlated with the fraud detection task). Therefore, learning to accurately predict the domain concepts can be very advantageous with respect to end-task predictions and end-user decisions.

In various embodiments, neural network 700 is trained using backpropagation and a gradient descent method. In various embodiments, a joint learning approach attempts to minimize both a decision loss, $L_D$, and an explanation loss, $L_E$. Given model parameters $\theta=[\theta_1, \theta_2, \ldots \theta_L, \theta_S, \theta_D]$, the outputs of the decision layer, $\delta_D(x,\theta)$, and the outputs of semantic layer, $\delta_S(x,\theta)$, the output of the gradient with respect to the loss, L, at the semantic layer is given by $$\nabla_{\delta_S} L(x, y, s) = \nabla_{\delta_S} L_D(\delta_D(x, \theta), y) + \nabla_{\delta_S} L_E(\delta_S(x, \theta), s), \quad \text{(Equation 1)}$$

where $$\nabla_{\delta_S} L_D(\delta_D(x, \theta), y) = \frac{\partial \delta_D(x, \theta)}{\partial \delta_S} \cdot \nabla_{\delta_D} L_D(\delta_D(x, \theta), y). \quad \text{(Equation 2)}$$

Various types of loss functions can be used. Which loss functions to use depends on the nature of the task. As the semantic task corresponds to a multi-labeling task, in some embodiments, a sigmoid function is used and applied to each individual entry of the output before using it in the loss function. To find a mapping that simultaneously satisfies satisfy $h:X{\rightarrow}Y$ and $h:X{\rightarrow}S$ for a given input vector, $x{\in}X$, in some embodiments, the (categorical) cross-entropy is mutually minimized for both tasks. Thus, for an input vector, $x{\in}X$, a set of domain concepts, $s{\in}S$, and decision labels, $y{\in}Y$, decision task and explanation task loss functions can be formulated as $$L_D(x, y) = -\sum_{i=1}^{|Y|} y_i \log[\text{softmax}(\delta_D(x, \theta)_i)] \text{ and} \quad \text{(Equation 3)}$$

$$L_E(x, s) = -\sum_{i=1}^{|S|} s_i \log[\text{sigmoid}(\delta_S(x, \theta)_i)], \quad \text{(Equation 4)}$$

respectively. Decision task loss and explanation task loss can be combined into a combined loss in which weights for decision task loss and explanation task loss can be adjusted: $L=\alpha*L_D+(1-\alpha)*L_E$ (Equation 5), where $\alpha{\in}[0, 1]$, e.g., $\alpha=0.5$ corresponds to equal weighting of decision task loss and explanation task loss.

Unlike conventional techniques such as distant supervision that typically directly apply human-defined labeling functions to the unlabeled dataset, the present disclosure relates to learning how to label concepts as a supervised task using the labeling functions and other available primitives as input.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving input records including tabular data, wherein the input records are unlabeled for a concept-explainability task;
   obtaining primitives for at least a subset of the input records, wherein the obtained primitives are based at least on at least one annotation including a plurality of user-defined concept labels;
   training, using one or more hardware processors, a plurality of candidate models using the obtained primitives;
   for each of the plurality of user-defined concept labels, using at least one corresponding model from the plurality of candidate models to determine a corresponding concept labeling model, wherein the corresponding labeling model includes a diversity layer and a generalization layer; and using the determined corresponding concept labeling models to label the input records with which to train a concept-explainability machine learning model using the labeled input records including by:

determining at least one concept correlation for the plurality of user-defined concept labels, wherein the at least one concept correlation includes an identification of a correlation between a first semantic representation of a data instance and a second semantic representation of the data instance;

selecting features based at least in part on the at least one concept correlation;

obtaining a diversity layer including by training, using the one or more hardware processors, the plurality of candidate models using the selected features; and obtaining a generalization layer including by training, using the one or more hardware processors, a respective model for each concept of a set of concepts based at least in part on the at least one concept correlation, wherein the respective model for each concept uses the obtained primitives and predictions made by the diversity layer for the concept and for other concepts in a set of concepts.

2. The method of claim 1, wherein the primitives are obtained based on at least one of: a heuristic, a manual label annotation, a concept primitive, or a feature of an upstream machine learning model.

3. The method of claim 1, wherein the primitives are obtained based on at least a concept taxonomy.

4. The method of claim 3, wherein at least one of:

the concept taxonomy is user-defined; or the at least one annotation is arranged according to the concept taxonomy.

5. The method of claim 1, wherein using the determined corresponding concept labeling models to label the input records includes labeling the input records with a concept label.

6. The method of claim 1, wherein using the at least one corresponding model from the plurality of candidate models includes selecting the at least one corresponding model according to a predetermined metric.

7. The method of claim 1, further comprising:

creating a first dataset based at least on the subset of the input records; and creating a second dataset based at least on the input records, wherein:

the second dataset has more records than the first dataset and the first dataset and the second dataset have the same fields; and the at least one annotation for obtaining primitives correspond to concept labels for records of the first dataset.

8. The method of claim 7, wherein obtaining the primitives includes labeling unannotated records as unlabeled in response to a determination that a record of the first dataset does not have a user-defined concept label.

9. The method of claim 1, wherein at least one of the primitives is determined based at least on applying at least one concept labeling function to the at least a subset of input records.

10. The method of claim 9, wherein at least one of the primitives includes concept-specific counts of the plurality of user-defined concept labels, the concept-specific counts being determined by applying the at least one labeling function to the at least a subset of input records.

11. The method of claim 1, wherein training the plurality of candidate models using the obtained primitives is based at least on randomly selected hyperparameters from a predetermined range.

12. The method of claim 1, wherein:

the plurality of candidate models includes a first candidate model corresponding to a first concept label and a second candidate model corresponding to a second concept label; and training the plurality of candidate models includes using a combination of hyperparameters, the hyperparameters being independently selected for the first candidate model and the second candidate model.

13. The method of claim 1, further comprising:

ranking training features including by averaging feature importance across the plurality of candidate models; and wherein training the plurality of candidate models using the obtained primitives includes using the ranked training features.

14. The method of claim 1, further comprising training the generalization layer including by utilizing an output of the diversity layer as input to the generalization layer.

15. The method of claim 1, wherein:

determining the at least one concept correlation for the plurality of user-defined concept labels is based at least on a pairwise correlation matrix between each pair of user-defined concept labels in respect of occurrences for a same record of a first dataset, the first dataset being based at least on a subset of the input records; and selecting the features is based on at least one of: a predetermined number of the best ranked features for each of the at least one user-defined concept label, a subset of the plurality of user-defined concept labels that are the most correlated, or a subset of the plurality of user-defined concept labels that are the least correlated.

16. The method of claim 1, wherein the tabular data includes records in rows and fields in columns, the fields including input record fields and class label fields.

17. The method of claim 1, wherein the concept-explainability machine learning model includes hierarchical multi-task machine learning model is configured to perform both a decision task to predict a decision result and an explanation task to predict a plurality of semantic concepts for explainability associated with the decision task, wherein a semantic layer of the hierarchical multi-task machine learning model associated with the explanation task is utilized as an input to a subsequent decision layer of the hierarchical multi-task machine learning model associated with the decision task.

18. A system, comprising:

a processor configured to:

receive input records including tabular data, wherein the input records are unlabeled for a concept-explainability task;

obtain primitives for at least a subset of the input records, wherein the obtained primitives are based at least on at least one annotation including a plurality of user-defined concept labels;

train, using one or more hardware processors, a plurality of candidate models using the obtained primitives;

for each of the plurality of user-defined concept labels, use at least one corresponding model from the plurality of candidate models to determine a corresponding concept labeling model, wherein the corresponding labeling model includes a diversity layer and a generalization layer; and use the determined corresponding concept labeling models to label the input records with which to train a concept-explainability machine learning model using the labeled input records including by:

determining at least one concept correlation for the plurality of user-defined concept labels, wherein the at least one concept correlation includes an identification of a correlation between a first semantic representation of a data instance and a second semantic representation of the data instance;

selecting features based at least in part on the at least one concept correlation;

obtaining a diversity layer including by training, using the one or more hardware processors, the plurality of candidate models using the selected features; and obtaining a generalization layer including by training, using the one or more hardware processors, a respective model for each concept of a set of concepts based at least in part on the at least one concept correlation, wherein the respective model for each concept uses the obtained primitives and predictions made by the diversity layer for the concept and for other concepts in a set of concepts; and a memory coupled to the processor and configured to provide the processor with instructions.

19. A computer program product embodied in a non-transitory computer readable medium and comprising computer instructions for:

receiving input records including tabular data, wherein the input records are unlabeled for a concept-explainability task;

obtaining primitives for at least a subset of the input records, wherein the obtained primitives are based at least on at least one annotation including a plurality of user-defined concept labels;

training, using one or more hardware processors, a plurality of candidate models using the obtained primitives;

for each of the plurality of user-defined concept labels, using at least one corresponding model from the plurality of candidate models to determine a corresponding concept labeling model, wherein the corresponding labeling model includes a diversity layer and a generalization layer; and using the determined corresponding concept labeling models to label the input records with which to train a concept-explainability machine learning model using the labeled input records including by:

determining at least one concept correlation for the plurality of user-defined concept labels, wherein the at least one concept correlation includes an identification of a correlation between a first semantic representation of a data instance and a second semantic representation of the data instance;

selecting features based at least in part on the at least one concept correlation;

obtaining a diversity layer including by training, using the one or more hardware processors, the plurality of candidate models using the selected features; and obtaining a generalization layer including by training, using the one or more hardware processors, a respective model for each concept of a set of concepts based at least in part on the at least one concept correlation, wherein the respective model for each concept uses the obtained primitives and predictions made by the diversity layer for the concept and for other concepts in a set of concepts.

* * * * *